(12) United States Patent
Bodurka

(10) Patent No.: US 12,723,462 B2
(45) **Date of Patent: *Sep. 1, 2026**

(54) DOORS AND SYSTEMS FOR CONTROL OF INTERNET OF THINGS (IoT) DEVICES AND METHODS THEREOF

(71) Applicant: Masonite Corporation, Tampa, FL (US)

(72) Inventor: Alex Bodurka, Portage, MI (US)

(73) Assignee: Masonite Corporation, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/583,555

(22) Filed: Feb. 21, 2024

(65) Prior Publication Data

US 2024/0195232 A1 Jun. 13, 2024

Related U.S. Application Data

(63) Continuation of application No. 18/091,869, filed on Dec. 30, 2022, and a continuation-in-part of application No. 17/982,268, filed on Nov. 7, 2022.

(Continued)

(51) Int. Cl.
*H02J 50/80* (2016.01)
*E06B 3/00* (2006.01)
(Continued)

(52) U.S. Cl.
CPC .................. *E06B 7/28* (2013.01); *E06B 3/00* (2013.01); *E06B 7/00* (2013.01); *G16Y 10/80* (2020.01);
(Continued)

(58) Field of Classification Search
CPC .. E05B 17/22; E05B 47/00; E05B 2047/0014; E05B 2047/0059; E05B 2047/0061; E05D 11/0081; E06B 3/00; E06B 7/00; E06B 7/28; G16Y 10/80; H02J 50/005; H02J 50/10; H02J 50/12; H02J 50/20; H02J 50/23; H02J 50/80
See application file for complete search history.

(56) References Cited

U.S. PATENT DOCUMENTS 3,848,361 A 11/1974 Foster et al.
4,140,357 A 2/1979 Wolz et al.
(Continued)

FOREIGN PATENT DOCUMENTS

AU 2020101466 A4 8/2020
CN 200968110 Y 10/2007
(Continued)

OTHER PUBLICATIONS

International Search Report and Written Opinion for Application No. PCT/US22/54365 mailed Apr. 24, 2023, 15 pp.

(Continued)

*Primary Examiner* — Levi Gannon
(74) *Attorney, Agent, or Firm* — IceMiller LLP

(57) ABSTRACT

The present disclosure provides a door or door system, including one or more doors configured with wireless power transfer system transmitters and/or receivers to power smart doors and/or peripheral wirelessly powered devices and, optionally, wireless data transmitters and/or receivers.

17 Claims, 11 Drawing Sheets

Related U.S. Application Data

(60) Provisional application No. 63/294,938, filed on Dec. 30, 2021, provisional application No. 63/276,060, filed on Nov. 5, 2021.

(51) Int. Cl.

| | |
|---|---|
| ***E06B 7/00*** | (2006.01) |
| ***E06B 7/28*** | (2006.01) |
| ***G16Y 10/80*** | (2020.01) |
| ***H02J 50/10*** | (2016.01) |
| ***H02J 50/20*** | (2016.01) |
| ***H02J 50/23*** | (2016.01) |

(52) U.S. Cl.

CPC .............. *H02J 50/10* (2016.02); *H02J 50/20* (2016.02); *H02J 50/23* (2016.02); *H02J 50/80* (2016.02)

(56) References Cited

U.S. PATENT DOCUMENTS 4,445,299 A 5/1984 Lehikoinen et al.
5,212,907 A 5/1993 Van Sandt
5,690,501 A 11/1997 Mader
5,727,960 A 3/1998 Zehrung
6,381,999 B1 5/2002 Doong
6,812,407 B1 11/2004 Opperman
7,696,644 B2 4/2010 Metz et al.
7,824,200 B2 11/2010 Bryla et al.
8,151,609 B2 4/2012 Stobbe et al.
8,156,671 B2 4/2012 Presley et al.
8,169,169 B2 5/2012 Hass et al.
8,193,764 B2 6/2012 Jakubowski
8,231,051 B2 7/2012 Popowski
8,294,302 B2 10/2012 Peabody et al.
8,337,039 B1 12/2012 Larkin
8,354,914 B2 1/2013 Buckingham et al.
8,448,382 B2 5/2013 Rodgers et al.
8,482,377 B2 7/2013 Finkenzeller
8,505,169 B2 8/2013 Wood et al.
8,517,747 B2 8/2013 Bryla et al.
8,571,471 B2 10/2013 Kuenzi et al.
8,772,970 B2 7/2014 Lambrou
8,774,714 B2 7/2014 Metivier
8,937,526 B2 1/2015 Chandler, Jr.
9,115,518 B2 8/2015 Herglotz et al.
9,143,000 B2 9/2015 Leabman et al.
9,235,942 B2 1/2016 Chen et al.
9,287,705 B2 3/2016 Meyer et al.
9,290,966 B2 3/2016 Hanchett, Jr.
9,378,597 B2 6/2016 Shen et al.
9,509,163 B2 11/2016 Corbin et al.
9,520,227 B2 12/2016 Herglotz et al.
9,607,459 B2 3/2017 Chang
9,644,401 B2 5/2017 Nguyen et al.
9,652,917 B2 5/2017 Johnson et al.
9,673,868 B2 6/2017 Curtis
9,704,316 B2 7/2017 Kirkjan
9,704,320 B2 7/2017 Johnson et al.
9,721,412 B2 8/2017 Kankkunen et al.
9,787,127 B2 10/2017 Shen
9,825,443 B2 11/2017 Shah et al.
9,871,399 B2 1/2018 Mittleman et al.
9,876,387 B2 1/2018 Geiszler
9,922,513 B1 3/2018 Hall et al.
9,940,766 B2 4/2018 Toivonen et al.
9,991,936 B2 6/2018 Toivonen et al.
10,037,636 B2 7/2018 Ho et al.
10,043,332 B2 8/2018 Scalisi et al.
10,049,517 B2 8/2018 Geiszler
10,078,929 B1 9/2018 Chen
10,135,288 B2 11/2018 Geiszler
10,147,254 B1 12/2018 Shen
10,202,785 B2 2/2019 Overgaard
10,255,737 B1 4/2019 Eichenblatt
10,347,064 B2 7/2019 Kim et al.
10,361,880 B1 7/2019 Marcinkowski et al.
10,438,431 B2 10/2019 Stephens et al.
10,453,280 B2 10/2019 Kontturi
10,465,422 B2 11/2019 Ullrich et al.
10,482,697 B2 11/2019 Kirkjan
10,643,412 B1 5/2020 Yang
10,664,688 B2 5/2020 Goulden et al.
10,691,953 B2 6/2020 Johnson et al.
10,733,823 B2 8/2020 Scalisi
10,755,509 B2 8/2020 Saeedi et al.
10,803,685 B2 10/2020 Marcinkowski et al.
10,818,118 B2 10/2020 Sivalingam et al.
10,938,250 B2 3/2021 Ahmed et al.
10,950,076 B1 3/2021 Hall et al.
10,964,138 B2 3/2021 Geerlings et al.
10,997,547 B2 5/2021 Hall et al.
10,999,092 B2 5/2021 Marcinkowski et al.
11,174,666 B2 11/2021 Demele et al.
11,244,523 B1 2/2022 Brady et al.
11,248,410 B2 2/2022 Dreyer et al.
11,290,298 B2 3/2022 Marcinkowski et al.
11,339,604 B2 5/2022 Dreyer
11,346,141 B2 5/2022 Gregoriou
11,346,150 B1 5/2022 Johnston
11,352,812 B2 6/2022 Johnson
11,373,471 B2 6/2022 Anderson et al.
D957,688 S 7/2022 Kim et al.
11,388,373 B2 7/2022 Scalisi
11,403,899 B2 8/2022 Zhang
11,403,902 B2 8/2022 Ho et al.
11,417,200 B2 8/2022 Hass et al.
11,441,332 B2 9/2022 Johnson et al.
11,532,192 B2 12/2022 Hass et al.
11,536,078 B2 12/2022 Dreyer
11,539,794 B1 12/2022 Weber et al.
11,543,801 B2 1/2023 Hall et al.
11,655,669 B2 5/2023 Hutton et al.
11,694,287 B2 7/2023 Marcinkowski et al.
11,729,014 B2 8/2023 Marcinkowski et al.
11,739,583 B2 8/2023 Sorice et al.
11,767,710 B1 9/2023 Johnston
12,141,130 B2 11/2024 Gong et al.
2007/0290793 A1 12/2007 Tran
2011/0056252 A1 3/2011 Simpson
2012/0242165 A1 9/2012 Herglotz et al.
2014/0020295 A1 1/2014 Bonahoom et al.
2014/0267739 A1 9/2014 Ibsies
2014/0347153 A1 11/2014 Moon
2014/0347163 A1 11/2014 Banter et al.
2015/0116811 A1 4/2015 Shrivastava et al.
2015/0120015 A1 4/2015 Fadell et al.
2015/0130287 A1 5/2015 Steudtner et al.
2015/0371469 A1 12/2015 Scalisi
2016/0017640 A1 1/2016 Soloway et al.
2016/0163139 A1 6/2016 Kankkunen et al.
2016/0180620 A1 6/2016 Eyring et al.
2016/0203703 A1 7/2016 Graeve
2016/0284206 A1 9/2016 Boettcher et al.
2016/0308396 A1 10/2016 Lewis et al.
2016/0322847 A1 11/2016 Geiszler
2016/0350988 A1 12/2016 Malhotra
2016/0364972 A1 12/2016 Torti
2017/0011570 A1 1/2017 Johnson et al.
2017/0040827 A1 2/2017 Weber
2017/0051530 A1 2/2017 Colman et al.
2017/0287241 A1 10/2017 Eyring et al.
2017/0316661 A1 11/2017 Modi et al.
2017/0358952 A1 12/2017 Butler et al.
2018/0025562 A1 1/2018 Chen
2018/0040182 A1 2/2018 Malhotra
2018/0114389 A1* 4/2018 Geiszler ............. G07C 9/00309
2018/0270276 A9 9/2018 Logue et al.
2018/0323632 A1 11/2018 Astarabadi
2018/0330589 A1 11/2018 Horling
2018/0340351 A1 11/2018 Harkonen et al.
2018/0343634 A1 11/2018 Yuan et al.
2019/0006875 A1 1/2019 Bien et al.
2019/0066413 A1 2/2019 Mcleod et al.

(56) References Cited

U.S. PATENT DOCUMENTS

2019/0066419 A1 2/2019 Mcleod et al.
2019/0146441 A1 5/2019 Cirino
2019/0188936 A1 6/2019 Sivill et al.
2019/0257142 A1 8/2019 Koehl et al.
2019/0271186 A1 9/2019 Chen et al.
2019/0280531 A1 9/2019 Ahmed et al.
2019/0333302 A1 10/2019 Kagnew et al.
2020/0014552 A1 1/2020 Tan et al.
2020/0048933 A1 2/2020 Li et al.
2020/0071991 A1 3/2020 Patel
2020/0082240 A1 3/2020 Heitmar
2020/0295598 A1 9/2020 Zeine
2020/0349786 A1 11/2020 Ho et al.
2020/0378172 A1 12/2020 Lerpard
2021/0052757 A1 2/2021 Baarman
2021/0183278 A1 6/2021 Lai
2021/0207419 A1 7/2021 Sorice et al.
2021/0207420 A1 7/2021 Sorice et al.
2021/0207421 A1 7/2021 Sorice et al.
2021/0209878 A1 7/2021 Kim et al.
2021/0277695 A1 9/2021 Bakker et al.
2022/0155005 A1 5/2022 Lee et al.
2022/0186543 A1 6/2022 Soderqvist
2022/0263297 A1 8/2022 Bodurka et al.
2022/0351722 A1 11/2022 Mandry et al.
2022/0392287 A1 12/2022 Shen
2022/0417630 A1 12/2022 Beltran
2023/0062621 A1 3/2023 Cheung
2023/0087532 A1 3/2023 Bodurka
2023/0141568 A1 5/2023 Sivasankaran et al.
2023/0184022 A1 6/2023 Eliasson et al.
2023/0216355 A1 7/2023 Bodurka
2024/0146046 A1 5/2024 Gong et al.
2024/0191555 A1 6/2024 Bodurka
2024/0191556 A1 6/2024 Bodurka
2024/0191565 A1 6/2024 Bodurka

FOREIGN PATENT DOCUMENTS

CN 101924398 A 12/2010
CN 103606213 A 2/2014
CN 104105248 A 10/2014
CN 203925102 U 11/2014
CN 204103574 U 1/2015
CN 104790834 A 7/2015
CN 205117039 U 3/2016
CN 105896708 A 8/2016
CN 105896739 A 8/2016
CN 106385112 A 2/2017
CN 106593124 A 4/2017
CN 106761274 A 5/2017
CN 106836990 A 6/2017
CN 206237206 U 6/2017
CN 106934881 A 7/2017
CN 206309153 U 7/2017
CN 206329255 U 7/2017
CN 107069986 A 8/2017
CN 107191110 A 9/2017
CN 107257155 A 10/2017
CN 107448128 A 12/2017
CN 107508352 A 12/2017
CN 107575137 A 1/2018
CN 107610390 A 1/2018
CN 107643706 A 1/2018
CN 206903524 U 1/2018
CN 107705511 A 2/2018
CN 107730687 A 2/2018
CN 107747457 A 3/2018
CN 107795255 A 3/2018
CN 107829659 A 3/2018
CN 107979148 A 5/2018
CN 108118987 A 6/2018
CN 207458156 U 6/2018
CN 108389290 A 8/2018
CN 108399674 A 8/2018
CN 108412359 A 8/2018
CN 108442852 A 8/2018
CN 108616169 A 10/2018
CN 108661486 A 10/2018
CN 108729758 A 11/2018
CN 108756617 A 11/2018
CN 108767941 A 11/2018
CN 108868508 A 11/2018
CN 108915498 A 11/2018
CN 108924015 A 11/2018
CN 108952449 A 12/2018
CN 109098543 A 12/2018
CN 109138774 A 1/2019
CN 109191617 A 1/2019
CN 109191739 A 1/2019
CN 109236134 A 1/2019
CN 109236135 A 1/2019
CN 109267837 A 1/2019
CN 109469412 A 3/2019
CN 109472902 A 3/2019
CN 208777869 U 4/2019
CN 110009782 A 7/2019
CN 110130737 A 8/2019
CN 110165758 A 8/2019
CN 110264682 A 9/2019
CN 209429913 U 9/2019
CN 110409954 A 11/2019
CN 110505182 A 11/2019
CN 110531631 A 12/2019
CN 209990389 U 1/2020
CN 110778265 A 2/2020
CN 111173404 A 5/2020
CN 111270959 A 6/2020
CN 111343432 A 6/2020
CN 111441680 A 7/2020
CN 211038390 U 7/2020
CN 211124167 U 7/2020
CN 111505947 A 8/2020
CN 111540093 A 8/2020
CN 111653025 A 9/2020
CN 111764747 A 10/2020
CN 211851423 U 11/2020
CN 112096221 A 12/2020
CN 112211496 A 1/2021
CN 112267796 A 1/2021
CN 112330869 A 2/2021
CN 112491668 A 3/2021
CN 112539020 A 3/2021
CN 213205374 U 5/2021
CN 112901047 A 6/2021
CN 113048374 A 6/2021
CN 113129476 A 7/2021
CN 113338772 A 9/2021
CN 113345130 A 9/2021
CN 113545639 A 10/2021
CN 113645446 A 11/2021
CN 113674454 A 11/2021
CN 113706744 A 11/2021
CN 214835862 U 11/2021
CN 214886488 U 11/2021
CN 214943492 U 11/2021
CN 215169563 U 12/2021
CN 113947834 A 1/2022
CN 217240775 U 8/2022
CN 217307315 U 8/2022
CN 115095246 A 9/2022
CN 115164381 A 10/2022
CN 115235096 A 10/2022
CN 115294675 A 11/2022
CN 115324428 A 11/2022
CN 115341821 A 11/2022
CN 115393988 A 11/2022
CN 218454661 U 2/2023
CN 115798084 A 3/2023
CN 116251221 A 6/2023
CN 219197192 U 6/2023
CN 219246122 U 6/2023
CN 116498183 A 7/2023
CN 116760602 A 9/2023

(56) References Cited

FOREIGN PATENT DOCUMENTS

| | | | |
|---|---|---|---|
| CN | 117238059 | A | 12/2023 |
| DE | 3612761 | C2 | 11/1988 |
| DE | 202022101334 | U1 | 5/2022 |
| EP | 0330828 | A1 | 9/1989 |
| EP | 0846823 | A1 | 6/1998 |
| EP | 1408456 | A2 | 4/2004 |
| EP | 2660785 | A2 | 11/2013 |
| EP | 2919202 | A1 | 9/2015 |
| EP | 3059359 | A1 | 8/2016 |
| EP | 3118405 | A1 | 1/2017 |
| EP | 3537398 | A1 | 9/2019 |
| EP | 3845729 | A1 | 7/2021 |
| FR | 2677396 | B1 | 9/1995 |
| FR | 3132160 | A3 | 7/2023 |
| IN | 201921017138 | A | 5/2019 |
| IN | 201911049967 | A | 12/2019 |
| IN | 201911048995 | A | 5/2021 |
| IN | 202111053824 | A | 12/2021 |
| IN | 202241020116 | A | 4/2022 |
| IN | 202241026843 | A | 5/2022 |
| IN | 411059 | B | 11/2022 |
| IN | 202111013824 | A | 12/2022 |
| IN | 430120 | B | 4/2023 |
| IN | 202341019331 | A | 4/2023 |
| JP | 2003184369 | A | 7/2003 |
| JP | 6680821 | B2 | 3/2020 |
| JP | 2020042440 | A | 3/2020 |
| JP | 6777955 | B2 | 10/2020 |
| KR | 100341117 | B1 | 6/2002 |
| KR | 200402154 | Y1 | 11/2005 |
| KR | 100672847 | B1 | 1/2007 |
| KR | 101038578 | B1 | 6/2011 |
| KR | 101139493 | B1 | 5/2012 |
| KR | 200461208 | Y1 | 6/2012 |
| KR | 101511059 | B1 | 4/2015 |
| KR | 101517832 | B1 | 5/2015 |
| KR | 20160018439 | A | 2/2016 |
| KR | 101601153 | B1 | 3/2016 |
| KR | 20160025226 | A | 3/2016 |
| KR | 20160050965 | A | 5/2016 |
| KR | 101651279 | B1 | 8/2016 |
| KR | 101656046 | B1 | 9/2016 |
| KR | 20160123639 | A | 10/2016 |
| KR | 20160124481 | A | 10/2016 |
| KR | 101800514 | B1 | 12/2017 |
| KR | 20180076537 | A | 7/2018 |
| KR | 20180130212 | A | 12/2018 |
| KR | 20180131716 | A | 12/2018 |
| KR | 20190001526 | A | 1/2019 |
| KR | 101983811 | B1 | 5/2019 |
| KR | 101988851 | B1 | 6/2019 |
| KR | 20190098719 | A | 8/2019 |
| KR | 20190098720 | A | 8/2019 |
| KR | 102024754 | B1 | 9/2019 |
| KR | 102064703 | B1 | 1/2020 |
| KR | 102079532 | B1 | 2/2020 |
| KR | 102150642 | B1 | 9/2020 |
| KR | 20200143302 | A | 12/2020 |
| KR | 20210004253 | A | 1/2021 |
| KR | 20210016726 | A | 2/2021 |
| KR | 20210019211 | A | 2/2021 |
| KR | 20210019216 | A | 2/2021 |
| KR | 20210019218 | A | 2/2021 |
| KR | 20210019241 | A | 2/2021 |
| KR | 20210045195 | A | 4/2021 |
| KR | 20210072510 | A | 6/2021 |
| KR | 20210078199 | A | 6/2021 |
| KR | 102303254 | B1 | 9/2021 |
| KR | 102329035 | B1 | 11/2021 |
| KR | 102341883 | B1 | 12/2021 |
| KR | 20210153308 | A | 12/2021 |
| KR | 20220031428 | A | 3/2022 |
| KR | 102421708 | B1 | 7/2022 |
| KR | 20220113136 | A | 8/2022 |
| KR | 20220119878 | A | 8/2022 |
| KR | 102472384 | B1 | 12/2022 |
| KR | 102534826 | B1 | 5/2023 |
| TW | M627626 | U | 6/2022 |
| WO | 0077330 | A1 | 12/2000 |
| WO | 2006006834 | A1 | 1/2006 |
| WO | 2007082959 | A1 | 7/2007 |
| WO | 2012013589 | A2 | 2/2012 |
| WO | 2013163124 | A1 | 10/2013 |
| WO | 2014111502 | A1 | 7/2014 |
| WO | 2016032464 | A1 | 3/2016 |
| WO | 2016164851 | A1 | 10/2016 |
| WO | 2016175910 | A1 | 11/2016 |
| WO | 2016180970 | A1 | 11/2016 |
| WO | 2017024088 | A1 | 2/2017 |
| WO | 2018115159 | A1 | 6/2018 |
| WO | 2018184450 | A1 | 10/2018 |
| WO | 2018184452 | A1 | 10/2018 |
| WO | 2018184453 | A1 | 10/2018 |
| WO | 2018184454 | A1 | 10/2018 |
| WO | 2018199370 | A1 | 11/2018 |
| WO | 2019068021 | A1 | 4/2019 |
| WO | 2019147941 | A1 | 8/2019 |
| WO | 2019162435 | A1 | 8/2019 |
| WO | 2019183340 | A1 | 9/2019 |
| WO | 2020028881 | A1 | 2/2020 |
| WO | 2021044248 | A1 | 3/2021 |
| WO | 2022004989 | A1 | 1/2022 |
| WO | 2022010071 | A1 | 1/2022 |
| WO | 2022010072 | A1 | 1/2022 |
| WO | 2022010073 | A1 | 1/2022 |
| WO | 2022010074 | A1 | 1/2022 |
| WO | 2022020893 | A1 | 2/2022 |
| WO | 2022145966 | A1 | 7/2022 |
| WO | 2022263147 | A1 | 12/2022 |
| WO | 2023180427 | A1 | 9/2023 |

OTHER PUBLICATIONS

International Search Report and Written Opinion Issued in International Application No. PCT/US2022/049152 mailed Feb. 8, 2023, 10 Pages.

Extended European Search Report issued in EP 22917383.5, dated Nov. 26, 2025 [9 pages].

* cited by examiner

DOORS AND SYSTEMS FOR CONTROL OF INTERNET OF THINGS (IoT) DEVICES AND METHODS THEREOF

CROSS-REFERENCE TO RELATED APPLICATIONS

This application is a continuation of U.S. patent application Ser. No. 18/091,869 filed Dec. 30, 2022, which claims the benefit of U.S. Provisional Application No. 63/294,938 filed Dec. 30, 2021 and is also a continuation-in-part of U.S. patent application Ser. No. 17/982,268 filed Nov. 7, 2022, which claims priority to U.S. Provisional Application No. 63/276,060 filed Nov. 5, 2021, the disclosures of which are incorporated herein by reference in its entirety.

FIELD

The present disclosure is directed to exterior or interior doors and system of doors for residential or commercial buildings, such as for a home, apartment, condominium, hotel room or business. In particularly, the door or system of doors provides electrical power and control for electrical devices are connected to the door or system of doors via a network. The invention is also directed to methods of providing electrical power and control to electrical devices connected to a door or a system of doors, such electrical devices operable over a network, such as via Internet of Things (IoT) protocols that include Wi-Fi™, Bluetooth™, etc.

BACKGROUND

Typical existing exterior or interior doors for residential or commercial buildings may have one or more electric devices (or components) mounted to the doors in order to provide desired functions, such as electronic access control, door state feedback, an entry camera and audio communication, an electric powered door latch, an electric powered door lock, etc. Also, the market for exterior and interior doors has seen an increasing adoption of additional electric devices, including video doorbells, smart locks, LED lighting, smart glass, electromechanical door closers, wireless connectivity electronics, etc. Each of these discrete electric devices is an add-on to an existing door, functions with the existing door construction, and is powered separately with at least one battery that needs periodic replacement or recharging. Should the battery not be replaced or recharged, then the electric device will not operate.

Current electric devices are mounted to exterior or interior doors or hardwired thereto in a manner that can be unattractive and unpleasant to look at. They typically each have either one or more rechargeable battery packs or at least one non-rechargeable battery that must periodically be replaced or changed and have some type of weatherable housing.

The internet of things (IoT) is a system of interconnected devices that are connected over a network to transfer data without requiring human interaction. The devices may be computers, mechanical machines, digital machines, or electrical devices that can be assigned an internet protocol (IP) address and are able to transfer data over the network.

The present disclosure recognizes a need for a door or system of doors configured to communicate over a network for wirelessly providing reliable power and control to IoT devices that are connected to the network, such as lights, cameras, sensors, locks and the like.

SUMMARY

The techniques of the present disclosure relate to a door or system of doors configured with wireless power transfer system transmitters and/or receivers to power smart doors and/or peripheral wirelessly powered devices and, optionally, wireless data transmitters and/or receivers.

In exemplary aspects, the present disclosure describes at least a first door, that includes a first door slab, with front and back door skins or facings attached to or part of a door frame, at least one hinge or hanging rail attachment, and a wireless power transfer system (WPTS) transmitter configured to wirelessly transmit power from a WPTS power source. In exemplary aspects, a system also includes at least a second door, including a door slab, with front and back door skins or facings attached to or part of a door frame, at least one hinge or hanging rail attachment, and a wireless power transfer system (WPTS) receiver configured to wirelessly receive power from the WPTS transmitter of the first door.

Exemplary aspects provide for various configurations for wireless power (and optionally data) transfer between doors or IOT devices, with at least one door acting as a repeater or transmitter. A door may also act as a gateway; or an externally electrically connected device may provide initial WPTS transmission and/or data connectivity (e.g., Internet connectivity).

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

The accompanying drawings are incorporated in and constitute a part of the specification. The drawings, together with the general description given above and the detailed description of the exemplary embodiments and methods given below, provide details of exemplary embodiments within the present disclosure. In such drawings.

DETAILED DESCRIPTION OF THE PREFERRED EMBODIMENT(S)

Figure 1:
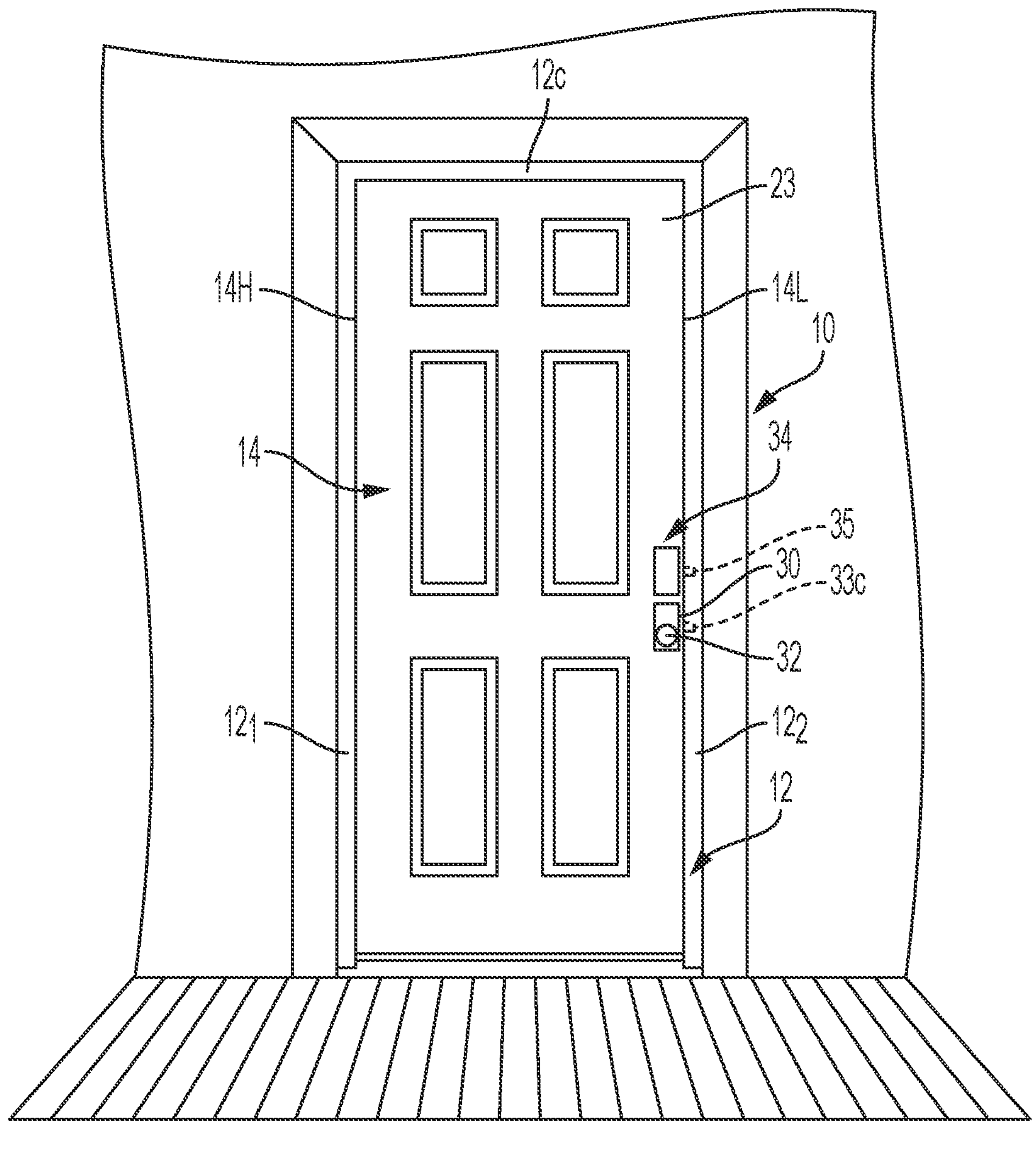
FIG. 1 is an elevational exterior view of an exemplary door system according to exemplary embodiments of the present disclosure.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as “horizontal,” “vertical,” “front,” “rear,” “upper”, “lower”, “top” and “bottom” as well as derivatives thereof (e.g., “horizontally,” “vertically,” “downwardly,” “upwardly,” etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise. The term “operatively connected” is such an attachment, coupling or connection that allows the pertinent structures to operate as intended by virtue of that relationship. The term “integral” (or“unitary”) relates to a part made as a single part, or a part made of separate components fixed (i.e., non-moveable) and connected together. Additionally, the word “a” and “an” as used in the claims means “at least one” and the word “two” as used in the claims means “at least two”.

Figure 2:
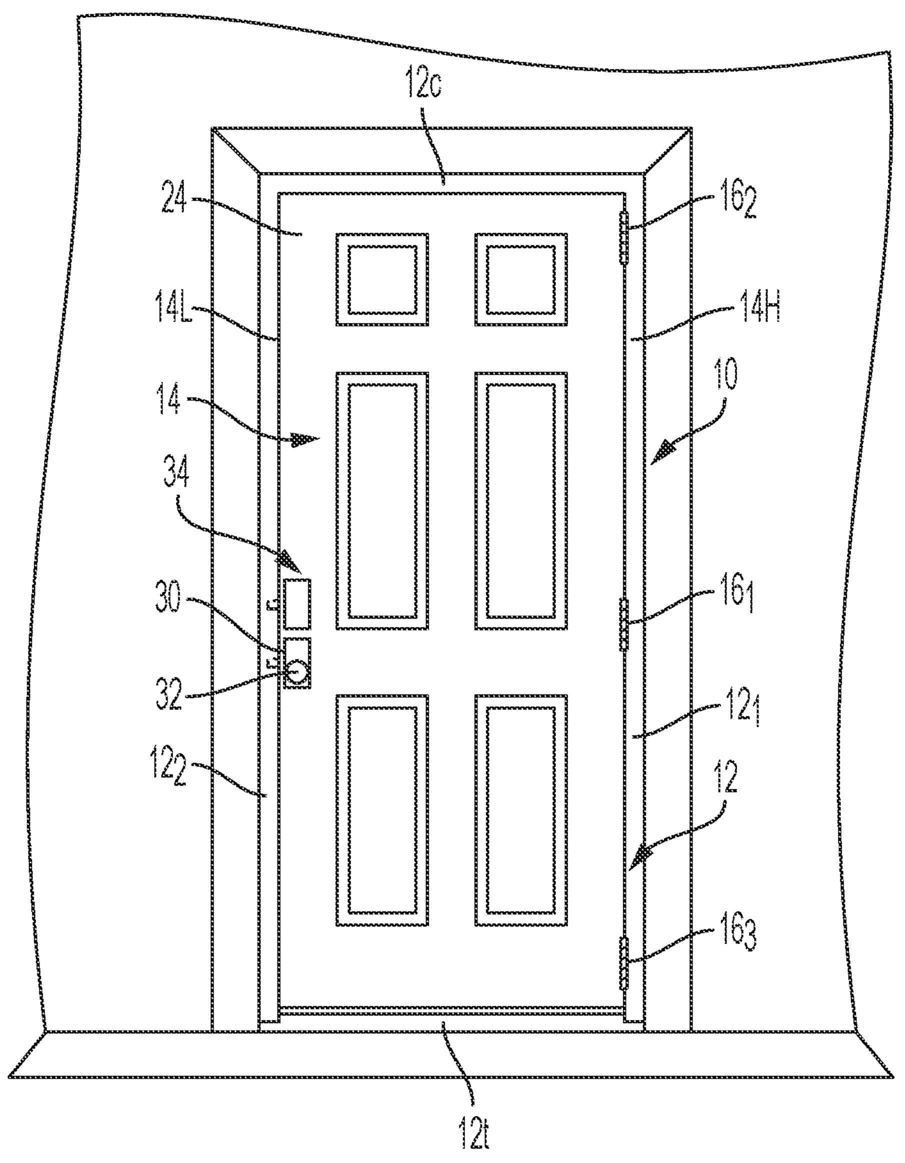
FIG. 2 is an elevational interior view of the door system.

FIGS. 1 and 2 illustrate a door system 10 according to an exemplary embodiment of the present disclosure, such as a pre-hung door. In exemplary embodiments, the door system 10 includes a conventional hinged residential interior door assembly 11, but it should be understood that the door assembly 11 may be a pivotally mounted exterior or interior door assembly provided for a residential or commercial building, such as a home, apartment, garage, condominium, hotel, office building, or the like. The door assembly 11 may be made of any appropriate material, such as wood, metal, wood composite material, fiberglass reinforced polymer composite, or the like. The door assembly 11 includes, in exemplary embodiments, a substantially rectangular door frame 12 and a door 14 pivotally attached thereto by at least one hinge $\mathbf{16}_1$, such as a “butt hinge” that includes two leaves. In exemplary embodiments, the door system 10 is a powered door system, such as is disclosed in co-pending U.S. patent application Ser. No. 17/142,759, the entire disclosure of which is incorporated by reference herein.

In exemplary embodiments, the frame assembly 12 includes first and second parallel, spaced apart vertically extending jamb members $\mathbf{12}_1$, $\mathbf{12}_2$ and a horizontally extending upper jamb rail member or header 12*c* that connects upper ends of the first and second jamb members $\mathbf{12}_1$, $\mathbf{12}_2$. Those skilled in the art recognize that lower ends of the jamb members $\mathbf{12}_1$, $\mathbf{12}_2$ may be interconnected through a threshold $\mathbf{12}_t$.

In further exemplary aspects, the at least one hinge $\mathbf{16}_1$ pivotally attaches the door 14 to the first jamb member $\mathbf{12}_1$. Typically, at least two hinges $\mathbf{16}_1$ and $\mathbf{16}_2$ are provided to secure the door 14 to the first jamb member $\mathbf{12}_1$. In exemplary embodiments, as best shown in FIG. 2, three hinges $\mathbf{16}_1$, $\mathbf{16}_2$, $\mathbf{16}_3$ are used to secure the door 14 to the frame assembly 12. In the interest of simplicity, the following discussion will sometimes use a reference numeral 16 without a subscript numeral to designate an entire group of hinges. For example, the reference numeral 16 will be sometimes used when generically referring to the hinges $\mathbf{16}_1$, $\mathbf{16}_2$and $\mathbf{16}_3$.

The illustrated door 14 includes a rectangular inner door frame 20, an exterior door skin (or facing) 23, and an interior door skin (or facing) 24 secured to opposite sides of the inner door frame 20. As used herein “exterior” indicates the side of the door that faces away from a room or house; and “interior” indicates the side of the door 14 that faces the interior of a room or house. The exterior and interior door skins 23 and 24 are formed separately from one another, and typically are identical in appearance. The door skins 23 and 24 are secured, e.g., typically adhesively, to a suitable core and/or to opposite sides of the inner door frame 20 so that the inner door frame 20 is sandwiched between the exterior and interior door skins 23 and 24. In exemplary embodiments, the exterior and interior door skins 23 and 24 are made of a polymer-based composite, such as sheet molding compound (“SMC”) or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The illustrated inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$ and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail $\mathbf{21}_3$, best shown in FIGS. 3-5. The mid-rail $\mathbf{21}_3$ extends horizontally and is spaced apart from the top and bottom rails $\mathbf{21}_1$ and $\mathbf{21}_2$, respectively, and is typically also manufactured from wood or an engineered wood, such as a laminated veneer lumber (LVL). Moreover, the mid-rail $\mathbf{21}_3$ may be fixedly secured to the first and second stiles $\mathbf{22}_1$ and $\mathbf{22}_2$. The hinges 16 are secured to the first stile $\mathbf{22}_1$, which defines a hinge stile of the inner door frame 20. The door 14 may also include a protective cap 19 made of composite material, best shown in FIG. 4. Specifically, the protective cap 19 can be made from polyvinyl chloride or other weatherable polymer. As further illustrated in FIGS. 3 and 4, the door 14 also includes a vertically extending inner stile $\mathbf{22}_3$, which is adjacent and horizontally spaced from the second stile $\mathbf{22}_2$ so as to define an open vertical channel 25 therebetween. The inner stile $\mathbf{22}_3$ may also be manufactured from wood or an engineered wood, such as a laminated veneer lumber (LVL).

The illustrated inner door frame 20 and the exterior and interior door skins 23, 24 of a typical door surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc. The frame assembly 12 includes first and second parallel, spaced apart vertically extending jamb members $\mathbf{12}_1$, $\mathbf{12}_2$ and a horizontally extending upper jamb member or header 12_c_ that connects upper ends of the first and second jamb members $\mathbf{12}_1$, $\mathbf{12}_2$. Those skilled in the art recognize that lower ends of the jamb members $\mathbf{12}_1$, $\mathbf{12}_2$ may be interconnected through a threshold $\mathbf{12}_t$.

The illustrated at least one hinge $\mathbf{16}_1$ pivotally attaches the door 14 to the first jamb member $\mathbf{12}_1$. In exemplary embodiments, at least two hinges $\mathbf{16}_1$ and $\mathbf{16}_2$ are provided to secure the door 14 to the first jamb member $\mathbf{12}_1$. Preferably, as best shown in FIG. 1, three hinges $\mathbf{16}_1$, $\mathbf{16}_2$, $\mathbf{16}_3$ are used to secure the door 14 to the frame assembly 12. In the interest of simplicity, the following discussion will sometimes use a reference numeral 16 without a subscript numeral to designate an entire group of the hinges. For example, the reference numeral 16 will be sometimes used when generically referring to the hinges $\mathbf{16}_1$, $\mathbf{16}_2$ and $\mathbf{16}_3$.

The illustrated door 14 includes a rectangular inner door frame 20, a first (or exterior) door skin (or facing) 23 and a second (or interior) door skin (or facing) 24 secured to opposite sides of the inner door frame 20. In further exemplary embodiments, the first and second door skins 23, 24 are formed separately from one another. The door skins 23, 24 are secured, e.g., typically adhesively, to a suitable core and/or to opposite sides of the inner door frame 20 so that the inner door frame 20 is sandwiched between the first and second door skins 23, 24. Typically, the first and second door skins 23, 24 are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$ and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail. The mid-rail extends horizontally and is spaced from the top and bottom rails $\mathbf{21}_1$ and $\mathbf{21}_2$, respectively, and is typically also manufactured from wood or an engineered wood, such as a laminated veneer lumber (LVL). Moreover, the mid-rail may be fixedly secured to the first and second stiles $\mathbf{22}_1$ and $\mathbf{22}_2$. The hinges 16 are secured to the first stile $\mathbf{22}_1$, which defines a hinge stile of the inner door frame 20.

The inner door frame 20 and the first and second door skins 23, 24 of a typical door surround an interior cavity 15, which may be hollow or may be filled with, for example, corrugated pads, foam insulation, or other core materials, if desired. Thus, the door 14 may include a core disposed within the inner door frame 20 between the first and second door skins 23, 24. The core may be formed from foam insulation, such as polyurethane foam material, cellulosic material and binder resin, corrugated pads, etc. The first and second door skins 23, 24 may be identical in appearance and may be flat or flush or have one or more paneled portions.

Figure 4:
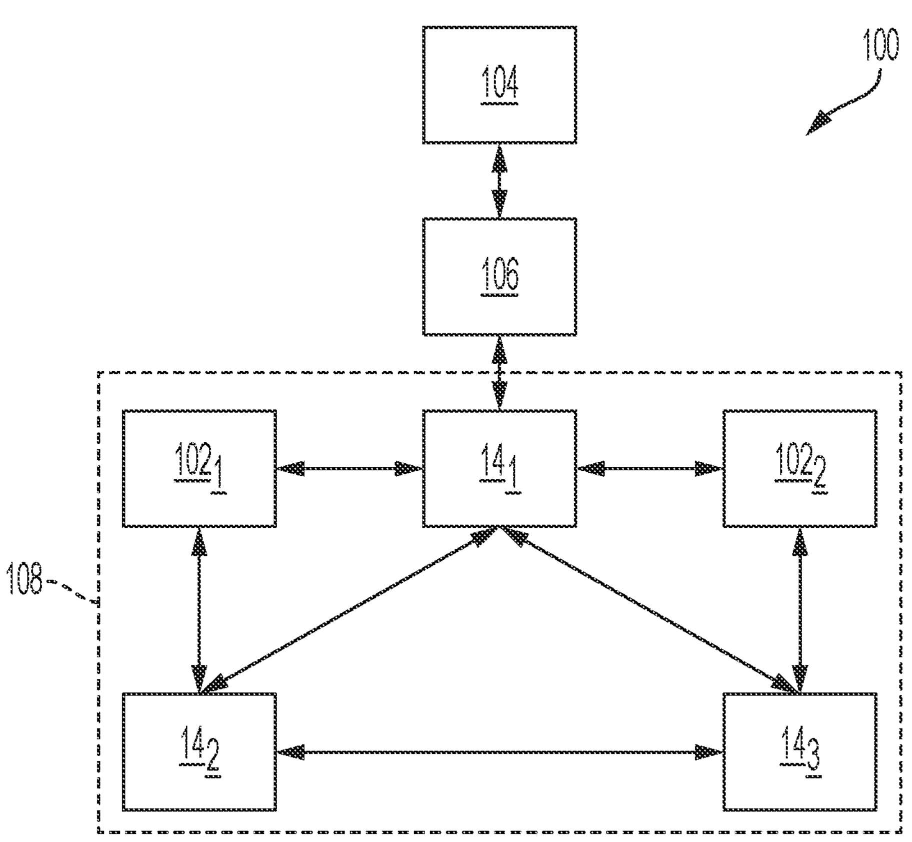
FIG. 4 is a flow diagram showing an exemplary network system according to exemplary embodiments of the present disclosure.

In exemplary embodiments described herein and referring to FIG. 4, one or several doors $\mathbf{14}_1$, $\mathbf{14}_2$, $\mathbf{14}_3$, when installed in a residential or commercial building, may be connected and communicate with each other over a wireless network system 100. Herein, subscripts are used after reference numerals to show more than one of the same element. One of the doors $\mathbf{14}_1$ is connected to the internet 106, such as through Wi-Fi or an ethernet connection and acts as an internet gateway, while e.g., other doors $\mathbf{14}_2$, $\mathbf{14}_3$ are not connected to the internet (though it is contemplated that they may be), but wirelessly communicate with each other and with door $\mathbf{14}_1$ and act as repeaters within the network system 100. Hereafter, door $\mathbf{14}_1$ is referred to as the gateway door and the other doors $\mathbf{14}_2$, $\mathbf{14}_3$ are referred to as the repeater doors (noting again that such "repeater doors" may also have internet connectivity of some sort). While FIG. 4 shows two repeater doors $\mathbf{14}_2$, $\mathbf{14}_3$ those skilled in the art will recognize, after reviewing the present specification, that there may be additional repeater doors. Additionally, there may be several doors that act as a gateway in a building, and in some cases all the doors may act as a gateway leaving none acting as a repeater.

The network system 100 may include one or more IoT electrical devices $\mathbf{102}_1$, $\mathbf{102}_2$ that are in wireless communication with one or more of the doors $\mathbf{14}_1$, $\mathbf{14}_2$, $\mathbf{14}_3$. The IoT devices 102 may be lights (such as LED lights), sensors (such as smoke sensors or motion sensors), cameras, door operators to open/close the doors, locks, computers, televisions, audio/video equipment for tele conferencing, heating/air conditioner units, fans, air purifiers, etc. In exemplary aspects, the doors $\mathbf{14}_1$, $\mathbf{14}_2$, $\mathbf{14}_3$ are configured to provide wireless power to, communicate with, and/or control the IoT devices 102. Without limitation, certain exemplary IoT devices may be provided at any location relative to the doors described herein, e.g., within one or more doors, as stand-alone devices, as part of other home or business devices, etc. Together, the gateway door $\mathbf{14}_1$, repeater doors $\mathbf{14}_2$, $\mathbf{14}_3$, and the IoT devices $\mathbf{102}_1$, $\mathbf{102}_2$ form an IoT network 108. Although FIG. 4 shows three doors $\mathbf{14}_1$, $\mathbf{14}_2$, $\mathbf{14}_3$ and two IoT devices $\mathbf{102}_1$, $\mathbf{102}_2$, any number of doors 14 and IoT devices 102 may reside on the network system 100. Importantly, the network system 100 has only a single gateway door $\mathbf{14}_1$ and several repeater doors $\mathbf{14}_2$, $\mathbf{14}_3$, which allows the network system 100 to operate at lower cost and consume less energy.

In certain situations, e.g., when the building is large, walls (e.g., constructed of metal) impeding wireless communication or power transfer, many IoT devices are on the network system, or high latency in system, more than one gateway door $\mathbf{14}_1$ may be used. Several factors can impact the decision to have multiple gateway doors $14_1$: number of devices connecting to each door, system latency, distance from door to door, physical mediums in between each door (e.g., metal walls). The network system 100 may also include a remote device 104 having a hardware and software platform for electronic communication with the gateway door $14_1$. The remote device 104 may be a smart phone, a smart watch, or a tablet that is associated with a user, such as a homeowner, building manager, system administrator, etc. As illustrated in FIG. 4, the remote device 104 may communicate wirelessly with the gateway door $14_1$ via the Internet 106. Although one remote device 104 is shown in FIG. 4, more than one device 104 may be used if more than one user is authorized. The authorized user may use the remote device 104 to configure the IoT network 108 with preferences, security features, etc.

The network system 100 includes the gateway door $14_1$, one or more repeater doors $14_2$, $14_3$, one or more IoT devices $100_1$, $100_2$, and one or more remote devices 104. The doors $14_1$, $14_2$, $14_3$ serve as sources of power and internet connectivity to IoT devices 100. Each of the doors $14_1$, $14_2$, $14_3$ is wired to the home/buildings mains power (120 VAC) and is connected to the internet 106, directly via ethernet or via an IoT protocol such as Wi-Fi™ (gateway door $14_1$) or indirectly (repeater doors $14_2$, $14_3$). The doors $14_1$, $14_2$, $14_3$ also have several radios for implementing various IoT protocols (such as Wi-Fi™, Matter™, Thread™, Zigbee™, Zwave™, and Bluetooth™). Because the network system 100 is connected to the cloud (i.e., Internet), a mobile app and/or web app present on the remote device 104 may be used to remotely control and configure the network system 100, and consequently the devices 102.

Multiple doors $14_1$, $14_2$, $14_3$ may be linked together over the network system 100, where one (or more) door $14_1$ can act as the gateway door (i.e., connected to the Internet) and the other doors $14_2$, $14_3$ only have radios for the network system 100 and thus act as IoT repeaters. When multiple doors are present, the IoT devices 102 can receive power and/or connectivity from any door. The door that provides the most efficient transfer of energy and/or connectivity can be used (usually the closest door without intervening interference). The IoT devices 102 can be manually configured to a specific room/area, thus still allowing the IoT devices 102 to be completely turned off/on when a particular room is not in use (thus need to turn all devices in that room off), while still allowing for optimal performance (i.e. energy transfer and connectivity) that may require the IoT device receiving power/connectivity from a door that is in an adjacent room.

Figure 5:
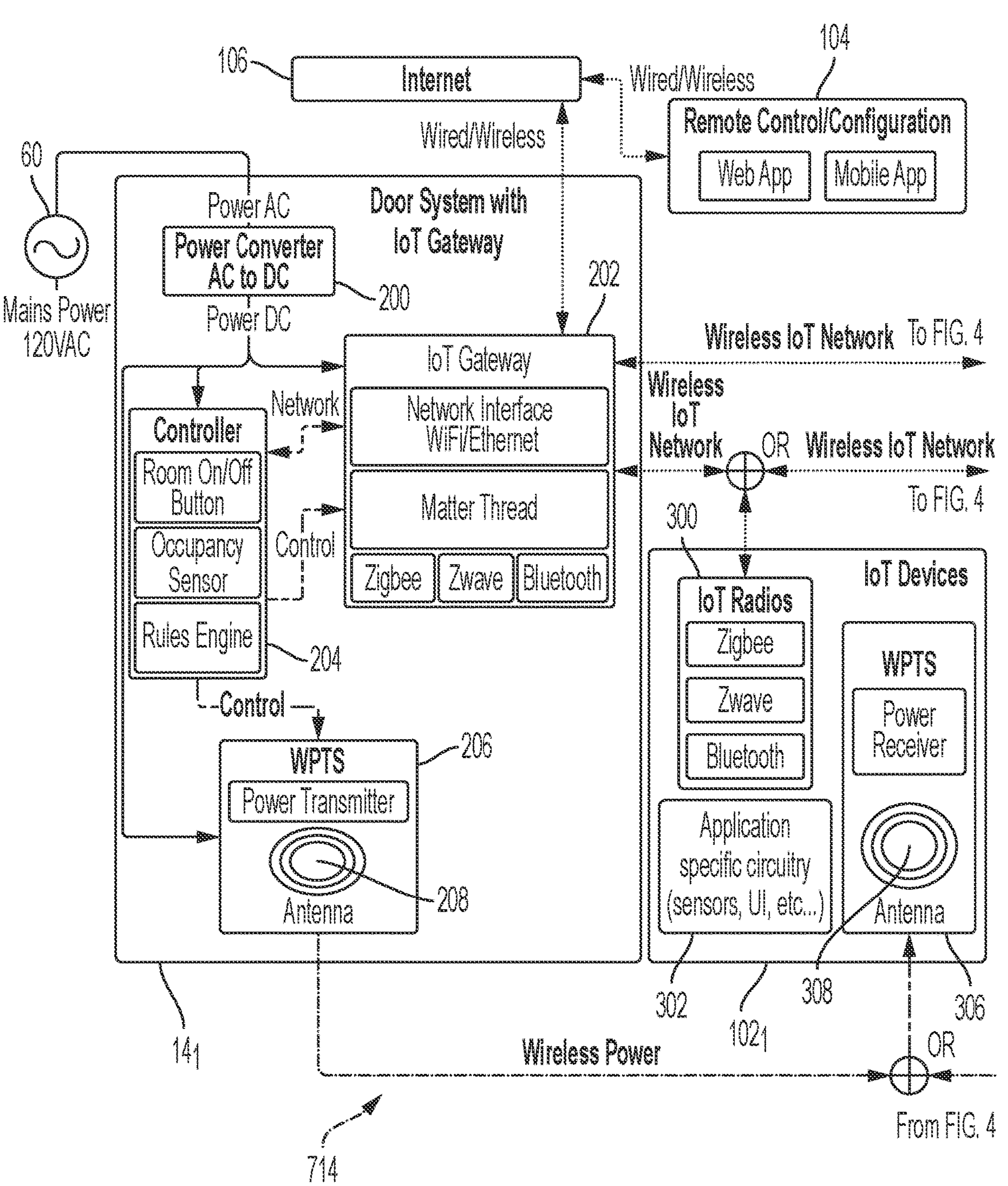
FIG. 5 is a flow diagram showing the details of the components of an exemplary gateway door and an exemplary IoT device and their communication pathways according to exemplary embodiments of the present disclosure.
Figure 6:
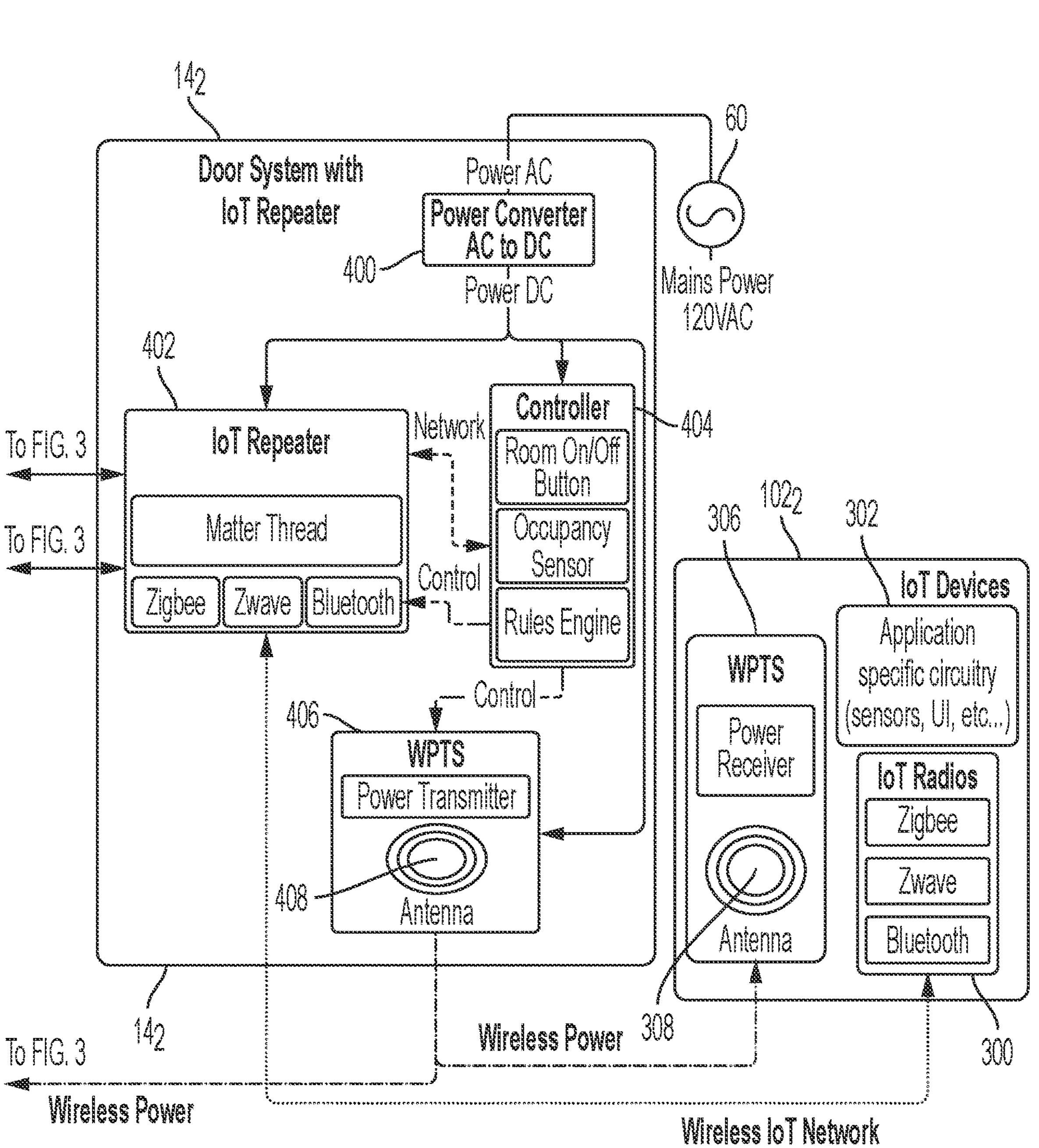
FIG. 6 is a continuation of FIG. 4 and shows the details of the components of the repeater door and the IoT device and their communication pathways.

FIGS. 5-6 show a schematic for the gateway door $14_1$, repeater door $14_2$or $14_3$, and IoT devices $102_1$, $102_2$. As shown in FIG. 5, the gateway door $14_1$ includes the following components: an AC to DC power converter 200, an IoT gateway 202, a controller 204, and a wireless power transfer system (WPTS) transmitter 206. The components may be located, partially or wholly, within the interior cavity 15 of the door $14_1$, door jamb 12, or connected thereto. In other exemplary embodiments, a WPTS transmitter is provided as a plug-in device (e.g., provided as a 120V plug in module) in a wireless power/communicative proximity to the gateway door, with wireless power provided from the external WPTS transmitter to the door (via a WPTS receiver 306 mounted in the door). Exemplary plug-in devices include those configured to plug into wall outlets, ceiling light fixtures, free standing light or other fixtures, powered tracks, etc. Further, data communication (e.g., Internet connectivity can be via the plug-in device in addition to, or in the alternative to, the gateway door (in the latter case, rendering the gateway door akin to a repeater door)).

In exemplary embodiments, the AC to DC power converter 200 converts alternating current (AC) to direct current (DC) used by the components on the door $14_1$. The converter 200 is electrically connected to a high voltage AC (such as 110 (or 120) V AC) power source 60. The AC power source 60 may be a standard 120 (or 110) volts general-purpose AC electrical power supply known in the USA as grid power, wall power, or domestic power. Other voltages, such as 220 volts, may also be used. The converter 200 rectifies the AC power from the power source 60 to DC for use by the IoT gateway 202, controller 204, and WPTS transmitter 206 as needed. Many IoT devices operate at 5 volts DC, and the converter 200 allows the appropriate power to be provided to and available for each of the devices.

The IoT gateway 202 bridges the IoT network 108 with the Internet 106 and communicates with the IoT devices 102 and the repeater door(s) $14_2$ and/or $14_3$. The IoT gateway 202 is connected to the internet by an ethernet connection (wired connection) or by Wi-Fi (wireless connection). The IoT gateway 202 is also connected to the repeater door(s) $14_2$ and/or $14_3$ wirelessly using standard IoT protocols, such as Wi-Fi™, Matter™, Thread™, Zigbee™, Zwave™, Bluetooth™, proprietary RF, or combinations thereof.

The controller 204 provides control logic to the WPTS transmitter 206 and the IoT gateway 202. In exemplary embodiments, the controller 204 provides two main controls. First, the controller 204 communicates with the remote device 104, via the Internet 106, to allow the user to switch on or off one or more of the IoT devices 102 by enabling or disabling the WPTS transmitter 206 to the one or more IoT devices 102. Second, the controller communicates with one or more occupancy sensors (located in/on the door system or remotely as one of the IoT devices 102) to automatically enable or disable the WPTS transmitter 206 to certain IoT devices 102 (e.g., IoT lights) to turn on or off those IoT devices. In this way, lights, etc. may be operated only when necessary and power saved when they are turned off when not needed. The rules for automatic activation/deactivation of the WPTS transmitter 206 may be preset by the user via the remote device 104 and saved to the cloud. The rules may be established when the remote device 104 initially is set up by the user.

The WPTS transmitter 206 may be used to wirelessly transmit electrical power to the IoT devices 102. Power is provided to the WPTS transmitter 206 by the converter 200. In general, as illustrated in FIG. 5, the WPTS includes the power transmitter 206, a transmitting antenna 208 operatively connected to the power transmitter 206, a WPTS receiver 306, and a receiving antenna 308 operatively connected to the WPTS receiver 306. As used herein, "antenna" may be a coil of wire which generates/receives a magnetic field, a metal plate which generates/receives an electric field, a metal rod which radiates/receives radio waves, or a laser which generates/receives light. The WPTS transmitter 206 and transmitting antenna 208 are located on the gateway door $14_1$ and repeater doors, while the WPTS receiver 306 and the receiving antenna 308 are located on the IoT devices 102.

Figure 7:
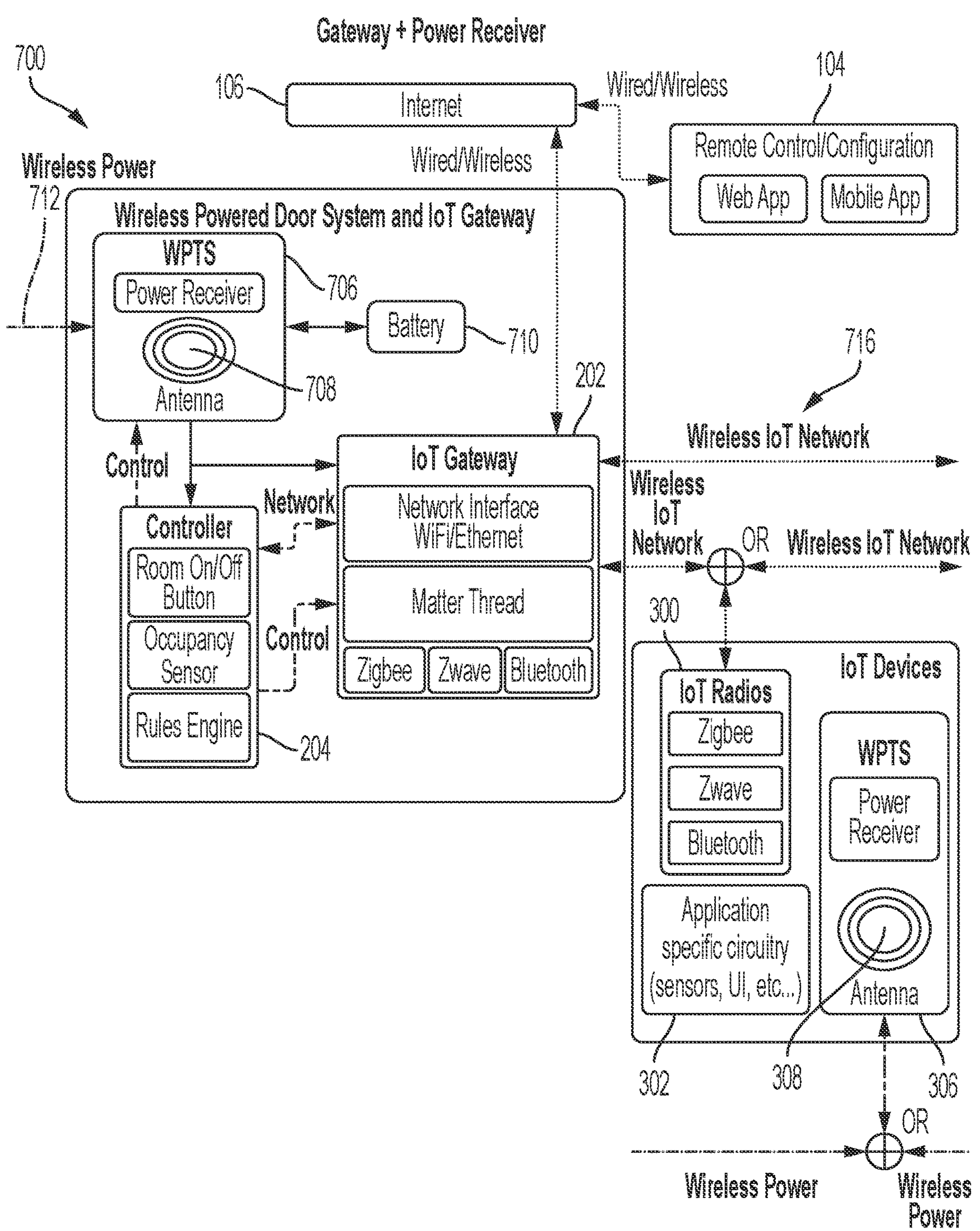
FIG. 7 is another flow diagram showing the details of the components of an exemplary gateway door and an exemplary IoT device and their communication and wireless power pathways according to exemplary embodiments of the present disclosure.
Figure 8:
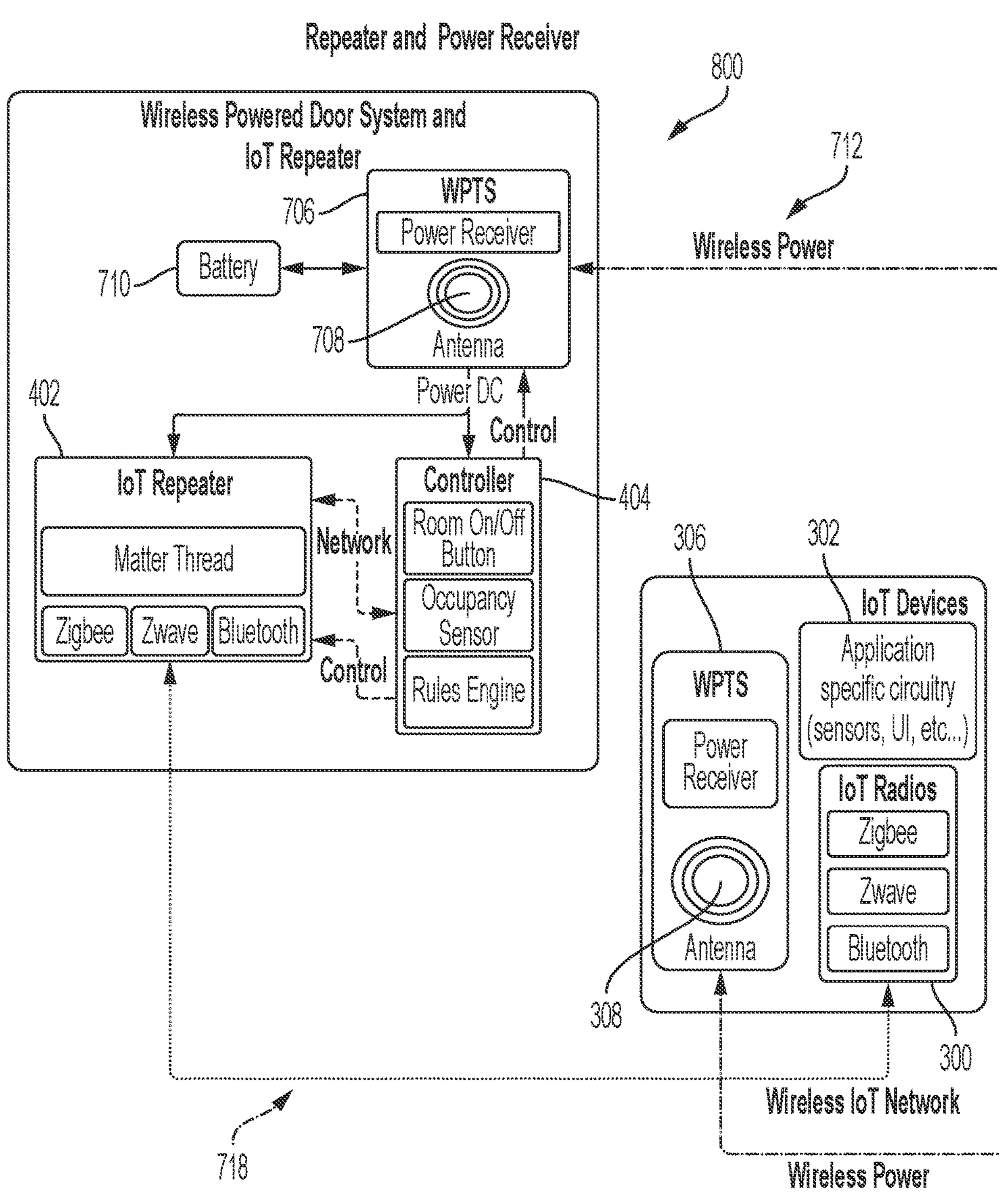
FIG. 8 is another flow diagram showing the details of the components of an exemplary repeater door and an exemplary IoT device and their communication and wireless power pathways according to exemplary embodiments of the present disclosure.

Alternatively, to having the power converters 200/400, WPTS transmitters 206/406, and transmitting antennas 208/408, the gateway and repeater doors may be configured to only receive wireless power and thus replacing these components with just a WPTS receiver and receiving antenna, like the IoT devices 102. For example, FIGS. 7 and 8 generally show additional exemplary gateway and repeater door configurations at 700 and at 800, respectively. In the illustrated exemplary embodiments of FIGS. 7 and 8, a WPTS receiver 706 and antenna 708 is provided on or within the door (e.g., between door skins) and wireless power being received generally at 712 at WPTS receiver 706. In FIG. 7, communication with a wireless IoT network is shown generally at 716 via IoT gateway 202. In FIG. 8, communication with a wireless IOT network is shown generally at 718 via IoT repeater 402 in FIG. 8. FIGS. 7 and 8 also show an internal (or door attached) battery at 710.

A door may also be equipped with both a WPTS transmitter and a WPTS receiver and their associated antennas, thus allowing them to "relay" wireless energy. Both gateway and repeater doors can be configured to relay wireless energy, . These relay doors may also be configured to receive a different type of wireless energy than it relays. For example, the door may receive Infrared energy and relay (i.e., transmit) RF energy. Reference is made to copending U.S. patent application Ser. No. 17/951,737, filed Sep. 23, 2022, and entitled "Door Assembly Having Rechargeable Battery, Methods and System for Charging the Battery", the entire contents of which are incorporated by reference, for description of exemplary techniques and technology for wireless power transmission.

Figure 9:
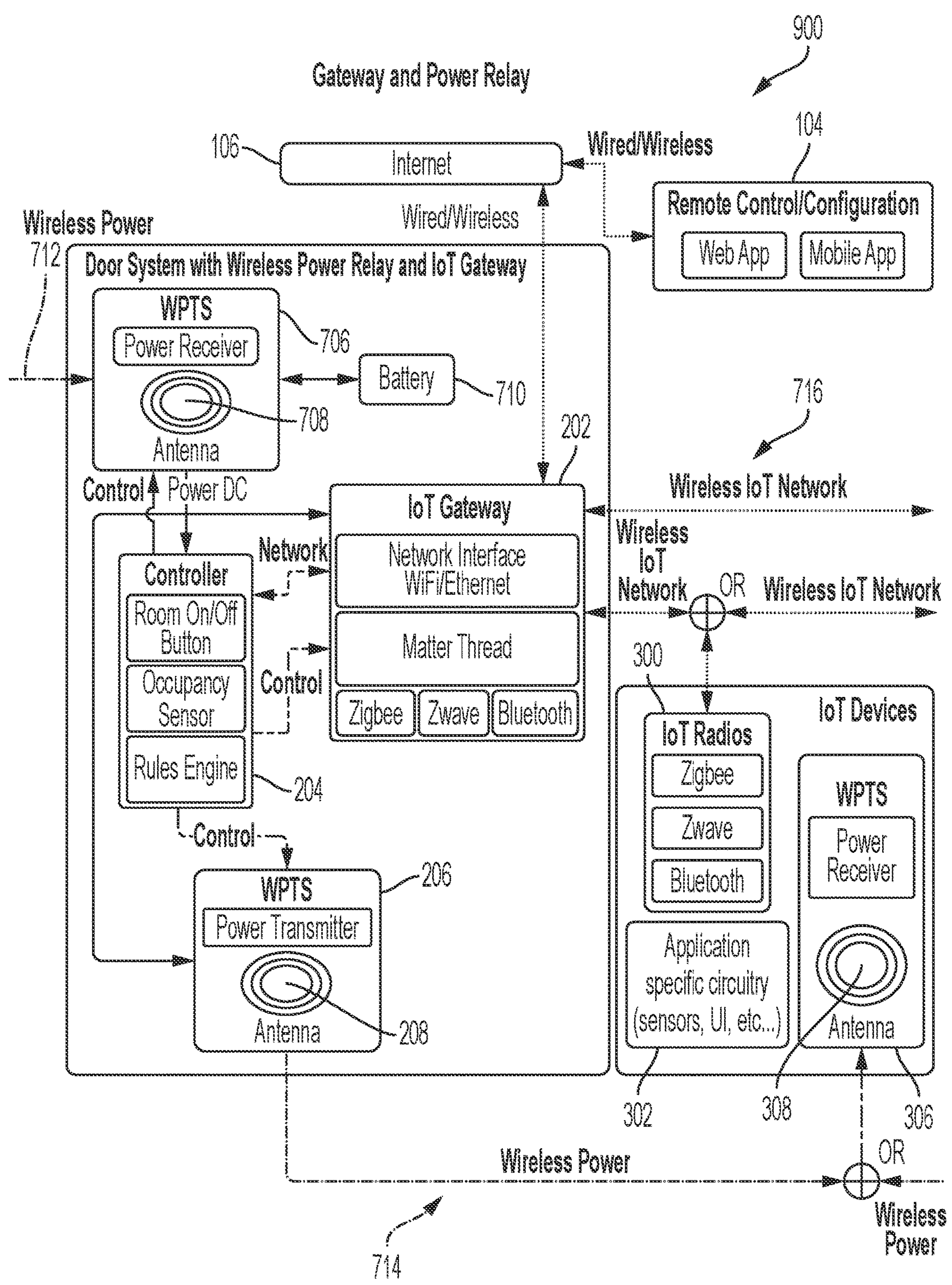
FIG. 9 is a flow diagram showing the details of the components of an exemplary gateway door and an exemplary IoT device and their communication and wireless power pathways according to exemplary embodiments of the present disclosure.
Figure 10:
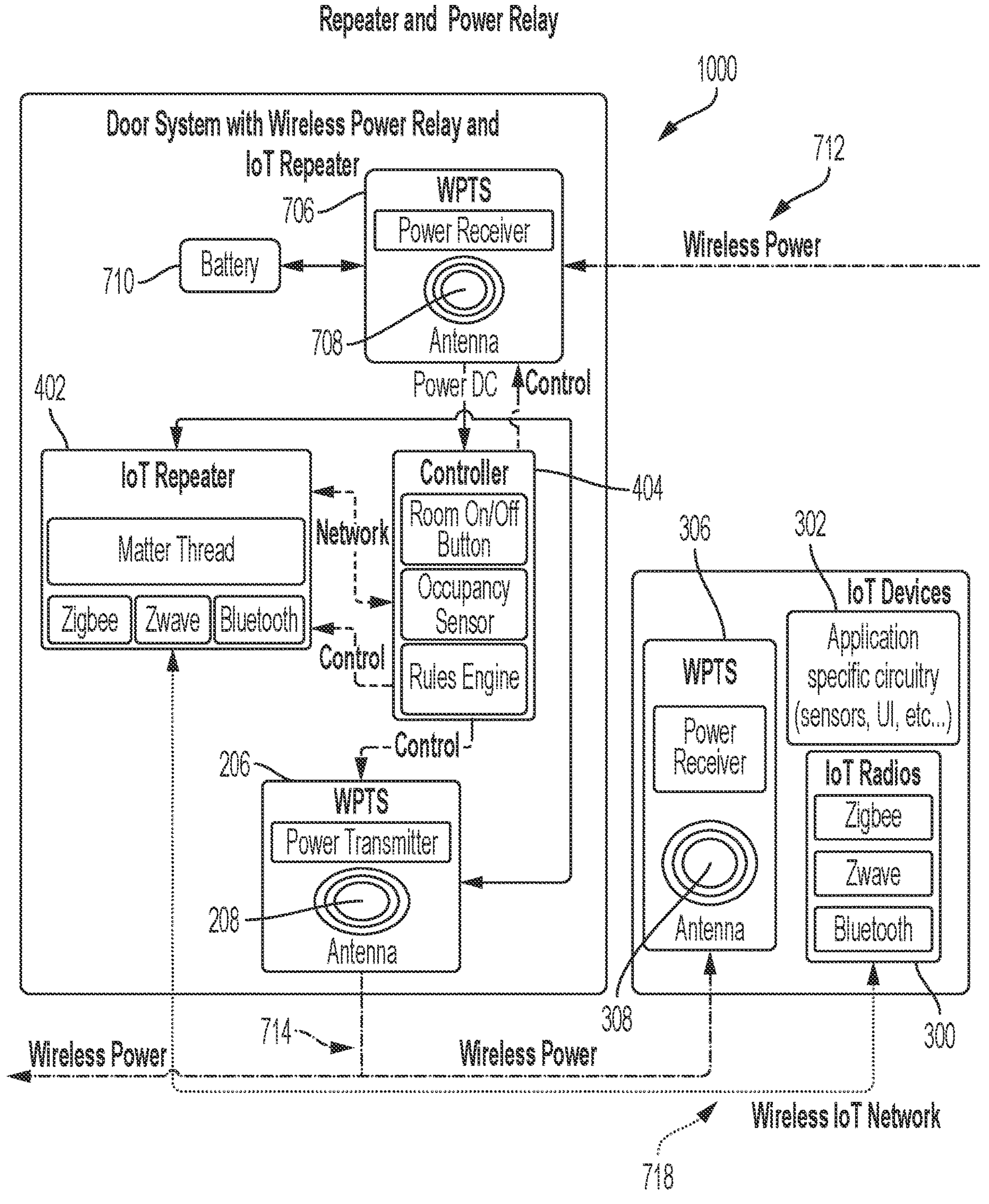
FIG. 10 is another flow diagram showing the details of the components of an exemplary repeater door and an exemplary IoT device and their communication and wireless power pathways according to exemplary embodiments of the present disclosure.

FIGS. 9 and 10 illustrate additional exemplary gateway and repeater door configurations at 900 and 1000, respectively, each showing receipt of wireless power and transmission of wireless power from a door. In the illustrated exemplary embodiments of FIGS. 9 and 10, a WPTS receiver 706 and antenna 708 is provided on or within the door (e.g., between door skins) and wireless power being received generally at 712 at WPTS receiver 706, with the addition of wireless power being transmitted generally at 714 via a WPTS transmitter 206 and antenna 208 provided on or within the door (e.g., between door skins). In FIG. 9, communication with a wireless IoT network is shown generally at 716 via IoT gateway 202. In FIG. 10, communication with a wireless IOT network is shown generally at 718 via IoT repeater 402 in FIG. 8. FIGS. 9 and 10 also show an internal (or door attached) battery at 710.

According to exemplary embodiments provided above, e.g., with reference to receipt of wireless power and transmission of wireless power from a door as in FIGS. 9 and 10, a "do it yourself" (DIY) system can comprise one or more doors easily installed and configured according to the needs of the installation. For example, an RF transmitter can send wireless power from a door to devices outside of IR line of sight; or if intended targets (either other door(s) or separate IoT devices) are all within line of sight of a particular transmitter, that transmitter can be installed to utilize an IR transmitter. Similarly, RF receiver(s) can be utilized for any transmission requirements that are not line of sight/appropriate for IR. Examples of this include, without limitation: an IR receiver and an IR transmitter in the same door, an IR receiver and an RF transmitter in the same door; an RF receiver and an IR transmitter in the same door; an RF receiver and an IR transmitter in the same door; or plural receivers and/or transmitters in the same door (any of which may operate in different mediums, e.g., IR and RF, etc.). Door(s) (and components of gateway or repeater doors) can thus be selected for an installation as desired to fulfill wireless power (and IoT network) needs specific to certain rooms or series of rooms.

In exemplary embodiments, the WPTS transmitter 206 converts power from the converter 200 to a time-varying electromagnetic field. The WPTS transmitter 206 and the WPTS receiver 306 on the IoT device 102 cooperate to transfer the time-varying electromagnetic field to the WPTS receiver 306 via the antennas 208 on the WPTS transmitter 206 and antenna 308 on the WPTS receiver 300, respectively. In turn, the WPTS receiver 306 receives the time-varying electromagnetic field and converts it to DC electric current to be used by the IoT device 102. Several techniques may be used to implement the WPTS: inductive coupling (transfer of electrical energy using electromagnetic induction between coils by a magnetic field); resonant inductive coupling (a form of the inductive coupling in which power is transferred by magnetic fields between two resonant circuits (tuned circuits), one in the transmitter and one in the receiver); capacitive coupling (transfer of electrical energy using electric fields for the transmission of electrical power between two electrodes (an anode and cathode) forming a capacitance for the transfer of power); magneto-dynamic coupling (transfer of electrical energy between two rotating armatures, one in the transmitter and one in the receiver, which rotate synchronously, coupled together by a magnetic field generated by magnets on the armatures); and microwaves (transfer of electrical energy via radio waves with short wavelengths of electromagnetic radiation, typically in a microwave range); light waves; or combinations thereof. In one technique the WPTS transmitter 206 generates a radio frequency (RF) power signal and transfers the RF power signal to the WPTS receiver 306 through the transmitting antenna 208 and the receiving antenna 308. The WPTS receiver 306 receives and converts (without limitation, e.g., 9 or more meters away from the transmitting antenna) the input RF power signal to an electric current to power the IoT device. As has been described herein, other contemplated technologies use of infrared (IR) technology that enables transmission, without limitation, of as much or more than 20 meters away from the transmitting source (or indeed at any distance having line of sight). In such a way, the role of a door (or window, etc.) itself can change from a traditional role to that of a source of wireless power.

The placement of the transmitting antenna 208 required for the WPTS transmitter 206 and IoT network 108 can vary. The transmitting antenna 208 may be placed in the jambs $\mathbf{12}_1$ or $\mathbf{12}_2$, doors 14, both the jamb and the door, or a combination of the two. Furthermore, the transmitting antenna 208 can be placed on both sides (interior and exterior) of a door 14 to provide greater range, increase overall system efficiency, and enhance performance. In exemplary embodiments, the transmitting antenna 208 is placed on the outside surface of the door 14 so that its transmission is not impeded. Usually, WPTS efficiency degrades when power is transferred through a physical medium (e.g., wall). Having the WPTS antennas on both sides of a door 14 eliminate the needs for power transfer through the physical medium to enhance WPTS efficiency. WPTS transmitter 206 may be place on the jamb $\mathbf{12}_1$ or $\mathbf{12}_2$, or inside the interior cavity 15 of the door 14.

Figure 3:
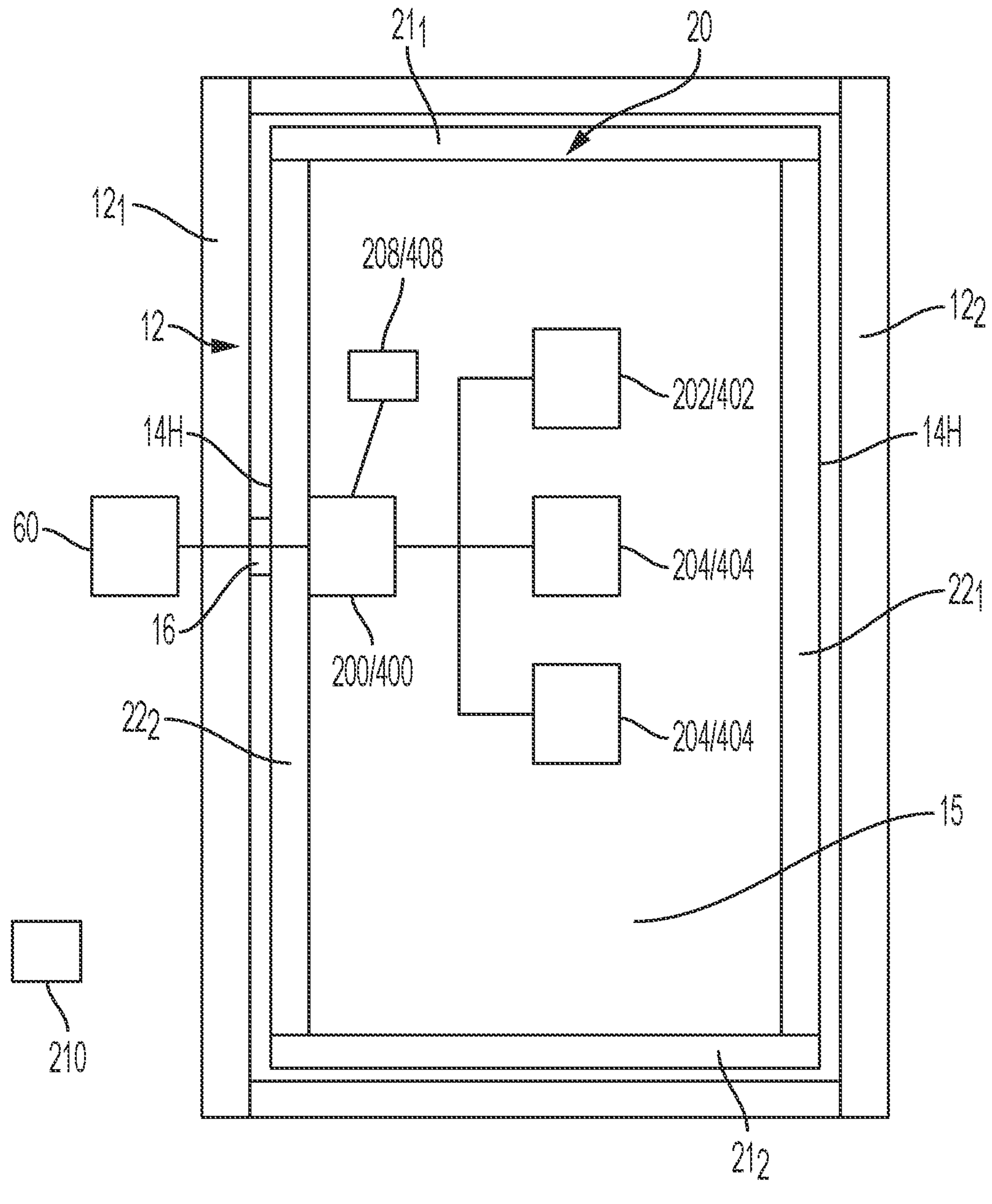
FIG. 3 is an elevational view of the door system the present invention without an exterior door skin in order to allow observation of the interior of the door.

With further reference to FIG. 3, one or more transmitting antennas 208/408 may also be provided in any given door transmitting wireless power. Similarly, if the door is equipped with a WPTS receiver 306, there may be one or more receiving antennas 308.

Doors configured to receive wireless power enable a "do-it-yourself" type retrofitting options for powered doors, as opposed to doors which need a wired power source which is a more complicated installation that typically requires a professional. In various exemplary embodiments described herein, consumers can simply remove old entryways and install one or more doors, and if applicable, plug in an external (i.e., not installed in a door) WPTS module(s)/ transmitter(s).

As shown in FIG. 6, each repeater door $14_2$ may be identical to the gateway door $14_1$, except that the repeater door includes an IoT repeater 402 instead of the IoT gateway 202. The IoT repeater 402 communicates only over the IoT network 108, i.e., with the IoT devices, other repeater doors $14_2$, $14_3$, or the gateway door $14_1$, but not directly to the Internet 106 (in some exemplary embodiments). The repeater door $14_2$ connects to the Internet only through the gateway door $14_1$. The repeater doors $14_2$ may also include a power converter 400, a controller 404, and a WPTS transmitter 406 operably connected to a transmitter antenna 408, which are identical to the power converter 200, the controller 204, the WPTS transmitter 206, and the transmitter antenna 208, respectively, as described above.

In exemplary aspects, the IoT devices 102 are all similarly equipped to operate with the network system 100 of the present invention. Exemplary IoT devices $102_1$, $102_2$ are shown in FIGS. 5-6 and preferably are identical; therefore, only one IoT device is discussed herein and referred to generally with reference numeral 102. As shown in FIGS. 5-6, the IoT device 102 have the following components: the WPTS receiver 306, an IoT radio 300, and application specific circuitry 302. The application specific circuitry 302 is specific to the kind of IoT device 102 and is needed for the functionality of the IoT device 102. For example, a camera would have a different application specific circuitry 302 than an LED light. The WPTS receiver 306 is operably connected to the receiving antenna 308; and their operation is discussed above.

The IoT radio 300 wirelessly communicates with either IoT gateway 202 on the gateway door $14_1$ or the IoT repeater 402 on the repeater door $14_2$ or both. Communication via the IoT radio 300 forms part of the IoT network 108 (discussed above). Some IoT devices may not have the need for an IoT radio and may only have a WPTS receiver system, for example a TV that does not need to have any IoT connectivity but could still receive power wirelessly from the door.

The application specific circuitry 302 is specific to the particular IoT device 102. As noted above, the IoT device 102 may be lights, sensors, cameras, door operators, locks, computers, televisions, audio/video equipment for tele conferencing, heating/air conditioner units, fans, air purifier. The application specific circuitry 302 may include sensor(s), such as a motion sensor; user interface; actuators for controlling the IoT device 102; and any other circuitry necessary to operate the IoT device 102. The user interface provides a platform for indicating the status of the IoT device 102 and/or for the user to input information or instruction to the IoT device 102. The user interface may include display(s) or light(s), e.g., showing the status of the IoT device 102, and/or buttons, e.g., for a user to enter information or instruction to the IoT device 102.

Figure 11:
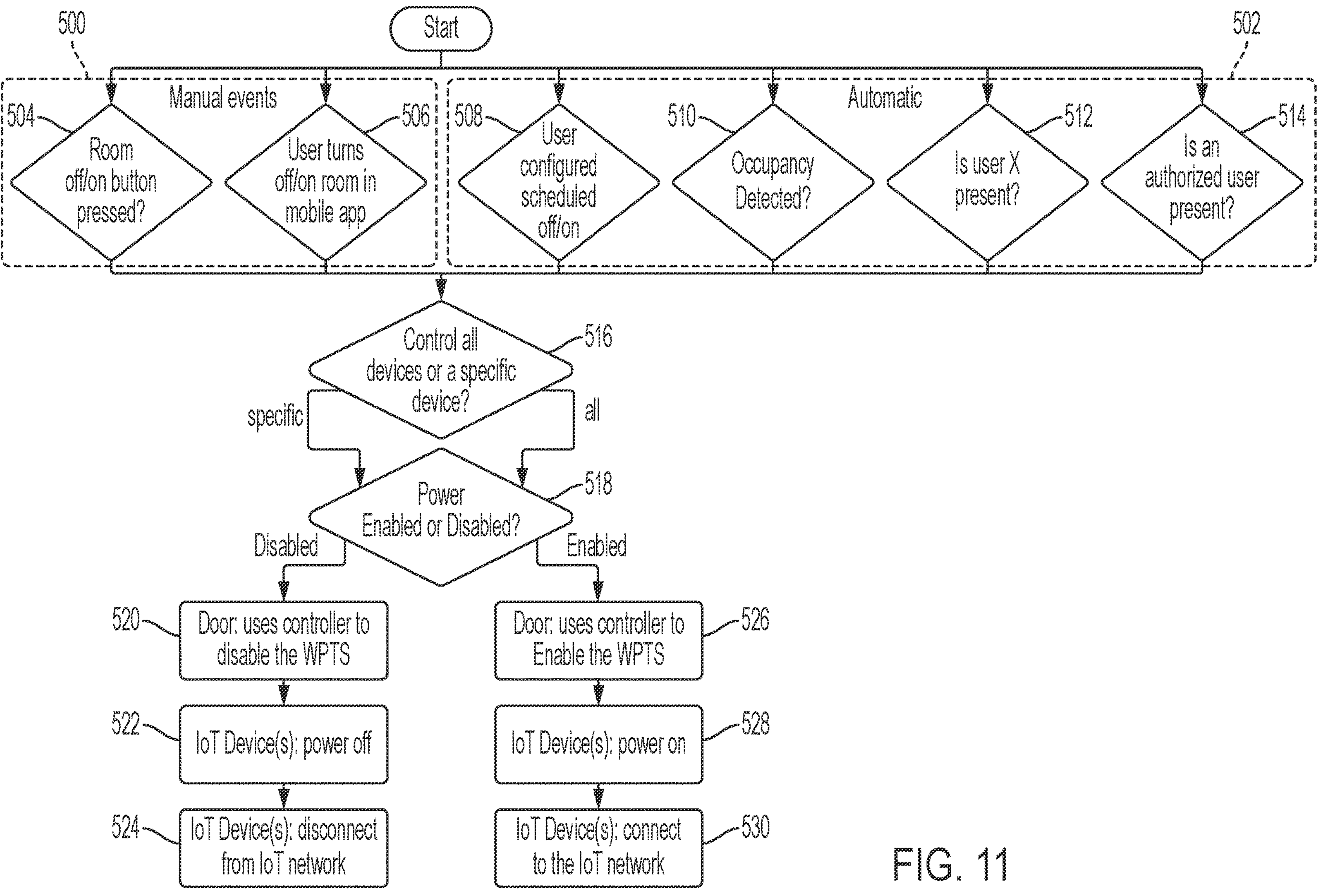
FIG. 11 is a flow chart showing operation of an exemplary system according to exemplary embodiments of the present disclosure.

Referring to FIG. 11, which illustrates an exemplary system 100, the system 100 operates either by manual user inputs (box 500) or by configurable automatic controls (box 502). Manual mode (box 500) allows users to turn the IoT devices 102 on/off by pressing a physical button (box 504), e.g., located on the door system or through an application on the remote device 104 (box 506). To use the remote device 104, the user may access the network system 100 from the remote device 104 through the internet 106. Additionally, if the remote device is equipped with an IoT radio then the remote device can be used to control when within range of the IoT network (example via Bluetooth™ IoT protocol).

The automatic mode (box 502) may operate through one of the following triggers: a preconfigure schedule (box 508), detection of occupancy of a room (box 510), detection/presence of a particular user (box 512), or detection/presence of an authorized user (box 514). The automatic mode (box 502) may be achieved by using the IoT network 108. For example, Bluetooth™ IoT protocol can be used to detect when a user's phone is within close proximity to the particular IoT device 104. Alternatively, a key fob may be used and incorporated in the IoT network 108. Depending upon the trigger, certain IoT device(s) may be turned on or off based a particular trigger. The user may be classified into different classes of users. For example, class A users can get full use of all devices in any room, while class B users are limited to only certain devices in certain rooms. Here, depending on the user, only certain IoT devices 104 and certain rooms are available to turn on. Once in manual (box 500) or automatic (box 502) mode, the operation of the system 100 determines whether all or only specific IoT device(s) 102 must be controlled (box 516). That determination is either preconfigured (if in automatic mode) or depends upon manual entry by the user. The IoT device(s) 102 to be controlled are then identified as being enabled or disabled (box 518). If disabled, the controller 204 (on the gateway door $14_1$) or 404 (on the repeater door $14_2$) turns off the WPTS transmitter 206 or 406 to the disabled device(s) 102 (box 520), thereby turning off the device(s) 102 (box 522) and removing the device(s) 102 from the IoT network 108 (box 524). If enabled, the controller 204 or 404 turns on the WPTS transmitter 206 or 406 to the enabled device(s) 102 (box 526), thereby powering on the device(s) 102 (box 528) and allowing the IoT the device(s) 102 to connect to the IoT network 108 (box 530). When enabled, the controller 204 or 404 turns on the device(s) 102. When disabled, the controller 204 or 404 turns off the device(s) 102.

In certain embodiments, the manual (box 500) and automatic (box 502) modes may operate simultaneously. For example, manual mode (box 500) can be used to override the current state of one or more of the IoT devices 102. This can be configured to remain in this mode until a particular automatic trigger re-enables the devices, or to stay in the manual configured state until another manual event is used. Additionally, both the manual (box 500) and automatic (box 502) modes can be disabled for a particular door 14 or IoT device 102, which may be configured from the remote device 104.

Alternatively, if the IoT device 102 is equipped with a small battery, the IoT network 108 can be used to inform the IoT device 102 to enter/exit a low power mode. When entering low power mode, the IoT device 102 disables the WPTS receiver 306, thus, cutting off power from the door 14. In low power mode, the IoT device 102 remains connected to the IoT network 108 which allows the IoT device 102 to receive a signal from the door 14 to turn on its WPTS receiver 306 when triggered by an automatic (box 502) or manual (box 500) trigger. This enables the use of different architectures for implementing the WPTS functionality, while still conserving power when the IoT device 102 is not in use.

Since the doors 14 can control the power of IoT devices 102 in an area, the network system 100 be configured to only turn on the device(s) 102 if an authorized user is present. Therefore, if an unauthorized user finds his/her way into a secure area, he/she will not be able to use the IoT devices. An example may be an office of an executive. When the executive leaves the room, the computer's power is disabled, thus preventing anyone from access to sensitive information on that computer.

The present network system 100 provides several advantages over the prior art systems. First, a single gateway door $\mathbf{14}_1$ provides energy conservation. Here, several IoT devices 102 are connected to a single gateway door $\mathbf{14}_1$ which allows IoT devices 102 to connect to the internet. This way, the IoT devices connect wirelessly to the gateway over an IoT network, and then the gateway door $\mathbf{14}_1$ bridges these IoT devices 102 to the internet. This system requires gateway door $\mathbf{14}_1$ to have the network interface for connecting to the internet, which allows the IoT devices to be lower cost and consume less energy. Having the gateway embedded to an object that is already in the house, i.e., the door, also saves space and is more aesthetically pleasing.

Second, the network system 100 provides an efficient energy source for the IoT devices 102. Electrical outlets are not always easily accessible and having to recharge/change batteries is a nuisance for homeowners. By having the doors 14 provide wireless power to the IoT devices 102, the homeowners/businesses need not be concerned about how to reliably provide power to their IoT devices 102. Additionally, the door that provides the most efficient transfer of energy and/or connectivity to the IoT device(s) can be used which allows for efficient energy usage and connectivity.

Third, the present network system 100 provides improved energy management. In both commercial and residential applications, conserving energy saves money and is preferred for environmental conservation. However, having to manually control power to all the IoT devices (and other devices teleconferencing systems, projectors, lighting) when they're not needed is difficult to manage. A door 14, being located at the entryway to a building or a room, is an ideal location to control the devices manually or automatically within the room/building to conserve energy when that area is not in use. Instead of having to change a house/building's infrastructure (i.e., wiring) to accommodate the ability to manage the power of a room or building, only one or more doors 14 need to be installed to control the power to the IoT devices 102 inside the room/building.

Fourth, the present network system 100 provides advanced security features. Because the system 100 can control the power to the IoT devices 102 in an area, it can be configured to only turn on devices if an authorized user is present. An example is provided above for the executive office.

Fifth, the present network system 100 provides an ideal location for WPTS. Common WPTS requires a large antenna that is not ideal aesthetically and is not easy to install. Since there is a lot of space in the door 14, large antennas may be used to improve system performance and efficiency. The antennas can be placed on both sides (interior and exterior) of the door system allowing for greater range and overall system efficiency and performance. Furthermore, this would allow a single WPTS system to be used to power devices in two areas (both sides of the door 14) rather than a single area, thus saving costs. The IoT devices 102 can be manually configured to a specific room/area, thus still allowing the room to be completely turned off while still allowing for optimal performance (i.e., energy transfer and connectivity).

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof.

What is claimed is:

1. A door network system, comprising:

a first door assembly comprising a first smart door and a first door frame, the first door assembly having a plurality of first door assembly wireless protocol components, wherein the plurality of first door assembly wireless protocol components comprise:

a wireless power transfer system (WPTS) device configured to wirelessly transmit power;

an Internet of Things (IoT) gateway or repeater;

at least two Internet of Things (IoT) devices integrated within the first smart door and configured to wirelessly communicate with each other through the first smart door; and a controller configured to automatically cause the WPTS device to cease transmitting power to at least one IoT device from among the at least two IoT devices to automatically disable said at least one IoT device; and at least a second door assembly comprising a second smart door and a second door frame, the second door assembly having at least one second door assembly wireless protocol component, wherein the at least one second door assembly wireless protocol component comprises one or more of an Internet of Things (IoT) device and a WPTS receiver, wherein at least one of the WPTS device, the IoT gateway or repeater and the controller is disposed at least partially within or connected to a door jamb member of the first door frame.

2. The door network system of claim 1, wherein at least one of the first door assembly and the second door assembly comprises an IoT gateway configured to provide Internet connectivity.

3. The door network system of claim 1, wherein at least one of the first door assembly and the second door assembly comprises an IoT repeater configured to capture the signal of a wireless network and to retransmit such signal to extend coverage for the wireless network.

4. The door network system of claim 1, wherein at least one of the first door assembly and the second door assembly comprises an IoT extender configured to receive the signal of a wireless network, to amplify such signal and to transmit a boosted wireless network signal.

5. The door network system of claim 1, wherein the first door assembly and the second door assembly each further comprises a wireless power transfer system (WPTS) component.

6. The door network system of claim 1, wherein at least one of the first door assembly and the second door assembly comprises a wireless protocol component disposed in or on a respective jamb.

7. The door network system of claim 1, wherein at least one of the first door assembly and the second door assembly comprises a wireless protocol component disposed in or on a respective smart door slab.

8. The door network system of claim 1, wherein at least one of the first door assembly and the second door assembly further includes or communicates with at least one additional IoT device having an IoT radio that operates on the network of said IoT device.

9. The door network system of claim 8, wherein the at least one additional IoT device comprises one or more of: a light; a camera; a security device; a motion sensor; a lock; a smoke sensor; a door operator; a computer; a television; conference equipment; a heating device; an air conditioning device; a fan; an air purifier; or combinations thereof.

10. The door network system of claim 9, wherein the at least one additional IoT device is separate from the first door assembly and the second door assembly.

11. The door network system of claim 9, wherein the at least one additional IoT device is disposed in or on a third smart door or third door assembly.

12. The door network system of claim 9, wherein at least one of the first door assembly and the second door assembly comprises a rechargeable battery and is configured to communicate with at least one additional IoT electrical device.

13. The door network system of claim 1, wherein at least one IoT device sends a wireless communication to one or more additional IoT devices.

14. The door network system of claim 13, wherein the at least one IoT device communicates via one or more IoT protocols that include at least one of Wi-Fi™, Matter™, Thread™, Zigbee™, Zwave™, Bluetooth™, and proprietary RF based IoT protocols.

15. The door network system of claim 1, wherein at least one of the first door assembly and the second door assembly comprises a smart door slab that further comprises front and back door skins or facings attached to or part of a door frame, and at least one hinge or hanging rail attachment.

16. The door network system of claim 1, wherein the plurality of first door assembly wireless protocol components comprises a first smart door WPTS receiver configured to receive wireless power from a WPTS power source.

17. The door network system of claim 1, wherein one or more of: the at least two IoT devices of the first smart door, the WTPS device of the first smart door, the IoT device of the second smart door and the WPTS receiver of the second smart door are powered via an RF or IR protocol power transmission.

* * * * *